(12) United States Patent
Truica-Marasescu et al.

(10) Patent No.: US 11,325,151 B2
(45) Date of Patent: *May 10, 2022

(54) PROCESS FOR COATING A SUBSTRATE WITH A CARBON-BASED MATERIAL

(71) Applicant: Grafoid, Inc., Ontario (CA)

(72) Inventors: Florina Truica-Marasescu, Odessa (CA); Mary F. M. Gallerneault, Kingston (CA); Rejean Lemay, Ontario (CA); John A. Ward, Ontario (CA)

(73) Assignee: Grafoid, Inc., Kingston (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,488

(22) Filed: Jun. 2, 2020

(65) Prior Publication Data

US 2020/0290083 A1    Sep. 17, 2020

Related U.S. Application Data

(63) Continuation of application No. 15/758,137, filed as application No. PCT/CA2016/051056 on Sep. 8, 2016, now Pat. No. 10,710,113.

(60) Provisional application No. 62/215,544, filed on Sep. 8, 2015.

(51) Int. Cl.
| | |
|---|---|
| *B05D 1/04* | (2006.01) |
| *B05D 3/00* | (2006.01) |
| *C01B 32/184* | (2017.01) |
| *C01B 32/192* | (2017.01) |
| *C01B 32/194* | (2017.01) |
| *C01B 32/198* | (2017.01) |
| *H01M 4/62* | (2006.01) |
| *B82Y 40/00* | (2011.01) |

(52) U.S. Cl.
CPC ............... *B05D 1/04* (2013.01); *B05D 3/002* (2013.01); *C01B 32/184* (2017.08); *C01B 32/192* (2017.08); *C01B 32/194* (2017.08); *C01B 32/198* (2017.08); *B05D 2210/00* (2013.01); *B82Y 40/00* (2013.01); *C01B 2204/22* (2013.01); *H01M 4/625* (2013.01)

(58) Field of Classification Search
CPC ... C01B 32/184; C01B 32/194; C01B 32/192; C01B 32/198; B82Y 40/00; B05D 1/04; B05D 3/002
See application file for complete search history.

(56) References Cited

U.S. PATENT DOCUMENTS

| | | | |
|---|---|---|---|
| 10,710,113 B2 * | 7/2020 | Lemay | B05D 1/04 |
| 2013/0180842 A1 * | 7/2013 | Blanton | C01B 32/184 |
| | | | 204/157.6 |
| 2014/0147602 A1 * | 5/2014 | Rafailovich | H01L 51/441 |
| | | | 427/558 |

* cited by examiner

*Primary Examiner* — Michael P Wieczorek
(74) *Attorney, Agent, or Firm* — Shackelford, Bowen, McKinley & Norton, LLP

(57) ABSTRACT

A coating process is described that coats a coil-to-coil continuous substrate with a graphene-like coating. The coating process includes cleaning and activating a substrate, applying a graphene oxide dispersion to the substrate, drying the coated sub-strate, and exposing the dried coating to VUV radiation under a dry atmosphere. The atmosphere for the last step includes one or more inert gases and optionally one or more reactive gases to repair defects in the coating and/or to functionalize the coating. This coating process allows for the formation of a polygranular graphene-like coating intimately in contact with the substrate. The graphene-like coating coats the substrate with multiple monolayers of graphene in a continuous manner.

18 Claims, 11 Drawing Sheets

PROCESS FOR COATING A SUBSTRATE WITH A CARBON-BASED MATERIAL

CROSS-REFERENCE TO RELATED APPLICATIONS

This application is a continuation of U.S. patent application Ser. No. 15/758,137, filed on Mar. 7, 2018, which is a U.S. National Stage Application of International Patent Application No. PCT/CA2016/051056, filed on Sep. 8, 2016, which claims priority to U.S. Provisional Patent Application No. 62/215,544, filed on Sep. 8, 2015. The entirety of each of the aforementioned applications is incorporated herein by reference.

FIELD OF THE INVENTION

The present invention relates generally to coating processes and more specifically to a photochemical process for coating a substrate with a carbon-based material such as graphene and chemically functionalised graphene.

BACKGROUND

Graphene is a two-dimensional nanomaterial composed of pure carbon that forms a sheet consisting of a single layer of carbon atoms in a $sp^2$ network arranged in a regular hexagonal pattern. The thickness of a graphene sheet is on the order of a single atomic unit, while its lateral dimension can approach up to tens of microns. Graphene has many desirable properties, including high electrical conductivity, good tensile and compressive strengths, excellent thermal properties, and it is light weight (at 0.77 milligrams per square meter). It is made of a lattice of 0.142 Nm-long carbon bonds. Such properties as strength and lightness make graphene a useful coating material for many applications.

A key aspect in the application of graphene is not only the production of the graphene, but the subsequent adhesion of the resultant graphene onto a surface of a substrate material. It is complex and costly for a substrate that is moving along a manufacturing production line to be coated with a continuous surface coating on a large commercial scale.

There are many ways to produce graphene. Most known methods are expensive and involve harsh chemicals and extreme environments. Initially, graphene was prepared at the individual sheet level by mechanical exfoliation from highly ordered pyrolytic graphite (HOPG) crystals, a method coined the Scotch tape method. The Scotch tape method is time consuming and produces only a small amount of graphene. Other synthetic methods attempt to improve on the Scotch tape method with the intent to scale up the production. For larger substrates, thin coats of high quality graphene have been prepared by epitaxial growth on SiC surfaces, and by chemical vapour deposition (CVD) on catalytic metal surfaces. For coating other types of substrates, costly and complicated transfer procedures are subsequently employed. Recently, graphene has been produced through chemical exfoliation of derivatized expanded graphite such as: graphite oxide; and halogenated graphene.

The use of graphene oxide ("GO") is a viable and cost effective alternative in the production of graphene. GO is a promising precursor for bulk production of graphene-based materials because it can be synthesized in large quantities from inexpensive graphite powders. Graphite is reacted with strong oxidants to form graphite oxide, followed by gentle exfoliation or delamination to form GO. The resulting GO is light brown in color and is water dispersible and insulating. Graphene oxide sheets are being explored as a possible intermediate for the manufacture of graphene. GO can then be reduced to form a mixture of reduced graphene oxide ("r-GO") and graphene. In such a mixture, a large portion of oxygen-containing functional groups have been removed by reactions with chemical reducing agents.

A challenge with deoxygenating treatments of GO in liquid phase is that, upon removal of the oxygen, the r-GO material is hydrophobic and therefore not dispersible in water and/or polar solvents. This hydrophobicity presents a challenge for coating processes based on the use of dispersions of r-GO. Thus, there exists a need for coating processes that produce graphene-like sheet coatings that are cohesive and adhere well to the surface being coated. Additionally, there exists a need for a process to coat materials with large surface areas with graphene-like coatings in a cost effective and environmentally benign manner.

SUMMARY

In an aspect of the present invention a process for coating a substrate with a carbon-based material is provided. In some embodiments of this aspect, the process for coating a substrate with a carbon-based material comprises cleaning a substrate to increase the wettability of the substrate, and activating the substrate to functionalize the surface with an oxygen-containing group. In certain embodiments of this aspect, the process for coating a substrate with a carbon-based material further comprises applying a GO dispersion solution onto the substrate through a spray method In other embodiments, the process for coating a substrate with a carbon-based material further comprises removing a solvent from the GO dispersion solution. In certain embodiments, the process for coating a substrate with a carbon-based material further comprises converting GO molecules within a GO flake/platelet into r-GO and graphene thereby forming a graphene-like coating.

In another aspect, the invention provides a process for coating a substrate with a carbon-based material comprising the steps of cleaning and activating a substrate by simultaneous exposure of the substrate surface to VUV (vacuum ultraviolet) radiation and to an atmosphere that comprises oxidizing radical species, coating the clean and activated substrate with a GO (graphene oxide) coating, and exposing the GO coating to VUV radiation under a dry atmosphere comprising one or more inert gases, wherein a graphene-like coating is formed that comprises a mixture of r-GO (reduced graphene oxide) and graphene.

In an embodiment of this aspect, one or more reactive gases are added to the one or more inert gases to (a) form a substantially defect-free graphene-like coating, (b) form a functionalized graphene-like coating, or both (a) and (b). In another embodiment, the process is conducted at atmospheric pressure. In another embodiment of this aspect, the oxidizing radical species include ozone, atomic oxygen, amino radicals, atomic hydrogen, hydroxide radicals, or a combination thereof. In certain embodiments of this aspect, the oxidizing radical species comprises one or more by-products of absorption of VUV photons by oxygen gas, carbon dioxide gas, ammonia, water, or a combination thereof. In an embodiment of this aspect, the clean and activated substrate with a GO (graphene oxide) coating comprises exposing the substrate to a temperature in the range of 80 to 100° C. In an embodiment of this aspect, the substrate is a continuous roll of material. In certain embodiments of this aspect, the roll of substrate is continuously moved through the process at a rolling speed of 1 to 1000 feet/min. In an embodiment of this aspect, the rolling speed ranges from 200 to 400 feet/min. In an embodiment of this aspect, coating the substrate with a GO (graphene oxide) coating comprises applying a GO dispersion and drying in an atmosphere of air. In an embodiment of this aspect, the inert atmosphere comprises nitrogen. In an embodiment of this aspect, the nitrogen has a gas purity of >99%. In an embodiment of this aspect, the step of exposing the GO coating to VUV irradiation is conducted under an atmosphere of a mixture of an inert gas and a reactive gas that comprises a polar moiety, an apolar moiety, a polymerizable moiety, or a combination thereof. In an embodiment of this aspect, the reactive gas comprises fluorine, and a fluorinated graphene-like coating is formed. In yet another embodiment of this aspect, the polar moiety comprises C—O, C=0, —COO, —C-halo, —C—F, N—H, C—P, P—O—P, P=0, or a combination thereof. In an embodiment of this aspect, the apolar moiety comprises C=C, C—N, C—H, C—S, or a combination thereof. In an embodiment of this aspect, the polymerizable moiety comprises hexamethyldisiloxane, HMDSO, tetraethyl orthosilicate, TEOS, titanium ethoxide, titanium isopropoxide, or a combination thereof. In another embodiment of this aspect, the functionalized graphene-like coating is included in an implant, scaffold for tissue engineering, a product for use in biological warfare, a product for use in a corrosive environment, drug delivery, gene therapy, cancer therapy, a bio-sensor, an electrochemical biosensor, a contact sensors, a nanoelectromechanical sensor, a chemical sensor, or a non-contact sensor.

In an embodiment of this aspect, the coating the clean and activated substrate with a GO coating comprises applying a GO dispersion via spraying, immersing, spreading via a roller or brush, flow coating, electrodepositing, roll-to-roll processing, painting, dipping, casting, brushing, applying by draw-down bar, doctor blade, knife, air knife, extrusion, heated spray, ink jet, lithography, flexography, or ink roller. In yet another embodiment of this aspect, the GO dispersion is a homogeneous liquid mixture. In an embodiment of this aspect, the GO dispersion comprises a polar solvent. In an embodiment of this aspect, the polar solvent is water, ethanol, methanol or a combination thereof. In an embodiment of this aspect, the substrate has a surface coverage of the coating of 20 to 100%. In an embodiment of this aspect, the surface coverage is 80 to 100%. In an embodiment of this aspect, the one or more reactive gas is: CH4, H2, C2H4, a saturated or unsaturated hydrocarbon that is liquid or gas at room temperature, or a combination thereof. In an embodiment of this aspect, a functionalized graphene-like coating provides the coated substrate with properties of hydrophobicity, hydrophilicity, oleophobicity, or oleophilicity.

In another aspect, the invention provides a product that comprises a graphene-like coating prepared by the process of any one of the claims presented herein.

In another aspect, the invention provides a product comprising a VUV radiation- and oxidizing radical species-treated substrate, and a graphene-like coating formed thereon. In an embodiment of this aspect, the invention provides an electrically conductive product such as a tunable electric conduction device, a lithium-ion battery electrode, an energy storage device, a supercapacitor, an EMI (electromagnetic induction) shield, transparent electronics, flexible electronics, nanoelectronics, nanogenerators, solar cells, fuel cells, hydrogen storage, photodetectors, OLED (organic light emitting diodes), electronic displays, solid lubricants, or diffusion barriers. In an embodiment of this aspect, the invention provides a product wherein the CE is greater than 40%. In another embodiment of this aspect, the invention provides a method of providing corrosion protection comprising coating metal with a graphene-like coating prepared by the process of any of the above aspects or their embodiments.

In another aspect, the invention provides a coating composition made by the process of any of the above aspects or their embodiments. In another aspect, the invention provides a method of providing water-repellancy to a substrate comprising coating the substrate with the graphene-like coating of any of the above aspects or their embodiments. In yet another aspect, the invention provides a method of providing anti-fouling properties to a substrate comprising coating the substrate with the graphene-like coating of any of the above aspects or their embodiments.

BRIEF DESCRIPTION OF THE DRAWINGS

It will now be convenient to describe the invention with particular reference to one embodiment of the present invention. It will be appreciated that the drawings relate to one embodiment of the present invention only and are not to be taken as limiting the invention.

DETAILED DESCRIPTION OF THE INVENTION

Definitions

As used herein, the term "CVD" refers to chemical vapour deposition. As used herein, the term "SEM" refers to Scanning Electron Microscopy. As used herein, the term "HOPG" refers to highly ordered pyrolytic graphite crystals.

As used herein, the gas flow rate unit "slm" refers to standard litre per minute, wherein the term standard indicates that the given flow rate assumes a standard temperature and pressure.

As used herein, the term "GO" refers to graphene oxide, which is an exfoliated oxidized graphite oxide that disperses in a basic solution to yield monomolecular sheets.

As used herein, the term "r-GO" refers to reduced graphene oxide.

As used herein, the term "graphene" refers to a single-layer form of graphite. It is an allotrope of carbon in the form of a two-dimensional, atomic-scale, honey-comb lattice, which is the basic structural element of other allotropes, including graphite, charcoal, carbon nanotubes and fullerenes. As used herein, the term "graphene-like" refers to sheets of carbon atoms arranged like they would be for graphene, but having imperfections in the sheet, such as: missing atoms, dangling or distorted bonds, or overlapping crystals.

As used herein, the term "inert atmosphere" refers to a gaseous environment that includes non-reactive gases (i.e. that do not decompose under the action of VUV photons) such as, for example, N2, Ar, He, Xe, Kr. N2 and Ar are used herein due to their availability and low cost relative to other inert gases.

As used herein, the term "wettability" refers to an ability of a solid surface to reduce surface tension of a liquid in contact with it such that it spreads over the solid surface and wets it. Good wettability is represented by a water contact angle of less than 20 degrees.

Figure 2:
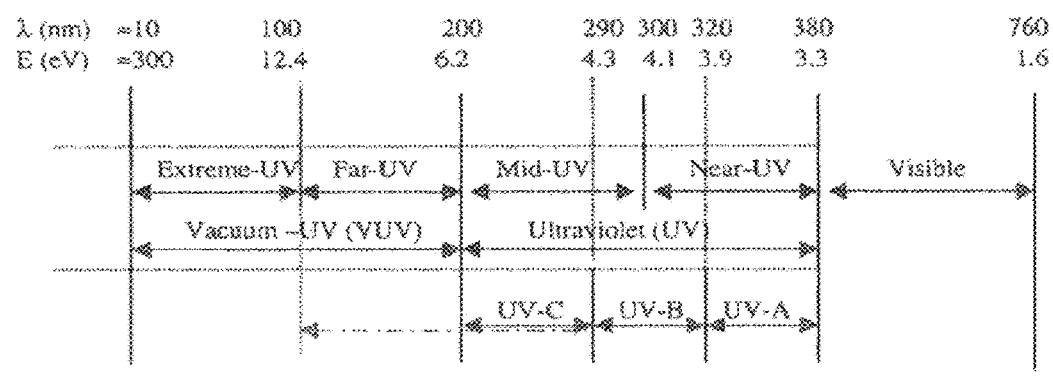
FIG. 2 is a schematic showing the wavelengths and the corresponding photon energies of VUV, UV portions of electromagnetic radiation.

As used herein, the term "VUV" refers to vacuum ultraviolet radiation of wavelength (A) in a range of about 10 to about 200 nm. VUV differs from UV, whose range of wavelength is about 280 nm to about 350 nm (see FIG. 2).

As used herein, the term "DWD" refers to diameter of water droplets.

As used herein, the term "D band" refers to banks/peaks at approximately 1300 cm−1 in Raman spectroscopy measurements that are characteristic of disordered graphene-like structures.

As used herein, the term "G band" refers to As used herein, the term "D band" refers to banks/peaks at approximately 1580 cm−1 in Raman spectroscopy measurements that are characteristic of graphene-like structures.

As used herein, the term "CE" refers to conversion efficiency, a percentage of converted product to unconverted product.

As used herein "WCA" or water contact angle refers to the angle where a liquid-vapor interface meets a solid surface and it is used to quantify the wettability of the solid surface.

As used herein, a "functional group" is a specific group of atoms within a molecule that are responsible for characteristic chemical reactions. Thus functional groups are moieties within a molecule that are likely to participate in chemical reactions.

EMBODIMENTS

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

Embodiments of the invention provide a large scale, industrial process that can be used for continuous or batch coating of substrate(s) with graphene-like material. This process can be used to coat substrates of different types of materials, which may or may not be on a coil-to-coil platform of flat strip product (e.g. batch processing of panels). Non-limiting examples of such substrates include metals, Si wafers, glass, polymer films or sheets, ceramics, paper, etc. An example of an industrial line performing this process can move at speeds between 0.01 and 300 m/min and has 4 consecutive steps: surface cleaning and activation; application of a GO dispersion; drying; and conversion of GO into r-GO and graphene thereby forming a graphene-like coating (see FIG. 1). This process and its steps are detailed below.

One of the advantages of this process is that it is performed under ambient conditions of pressure and temperature. The drying step is conducted under higher temperatures, but the other steps are conducted under ambient temperatures. In regard to pressure, some embodiments of the invention are conducted under 1 atm of pressure.

Figure 1:
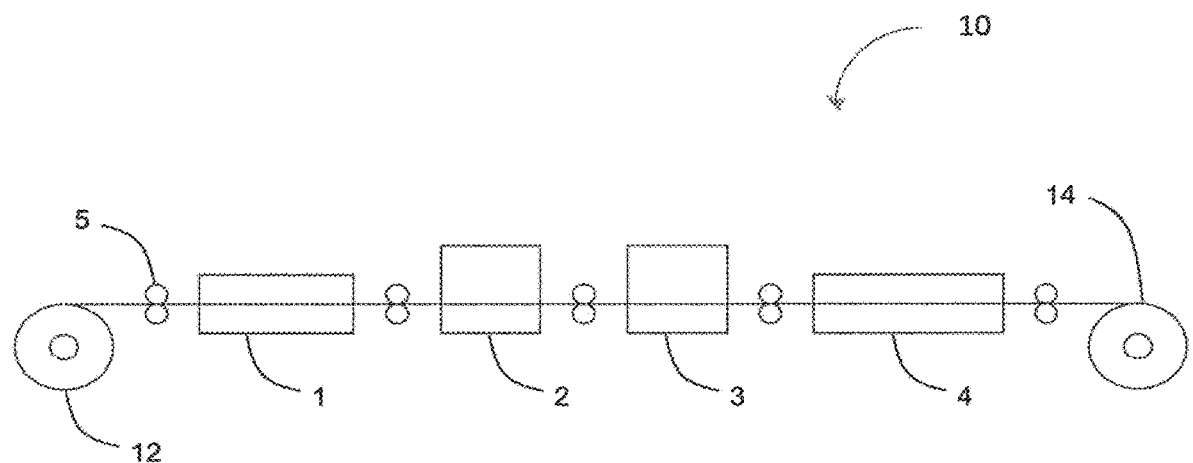
FIG. 1 is a schematic representation of a continuous coating process for producing a substrate with a graphene-like coating material, according to one embodiment of the present invention.

Referring to FIG. 1, and according to one embodiment of the present invention, a coating process 10 for producing a coated substrate with a graphene-like coating is described in greater detail.

Step 1: Cleaning and Activation

Step 1 in the coating process 10 is a cleaning/activation step and is represented by component 1, a cleaner/activator. The cleaning/activation step serves as a dual function: to increase wettability of the substrate to a degree that ensures uniform spreading of the GO dispersion solution, and to functionalize the surface of a substrate with oxygen containing groups, such as, for example, C—OH, C=O, and epoxides. Cleaning and activation was achieved by removing residual carbon-based organic contaminants from the surface of the substrate. At the same time, the above mentioned oxygen-containing functional groups were grafted on the surface of the substrate. The oxygen-containing functional groups were covalently attached to residual carbon and to surfaces of the substrate (activation). The oxygen-containing functional groups formed a strong covalent interface that allowed the substrate to interact with the subsequent graphene-like coating of the present coating process 10. The cleaning portion involved simultaneous exposure of the substrate surface to the action of vacuum ultraviolet (VUV) radiation of wavelength between about 10 nm and about 200 nm and to oxidizing radical species or polar radical species. These species may include, but are not limited to: ozone; atomic oxygen, amino radicals, atomic hydrogen; and, hydroxide radicals. A worker skilled in the relevant art would appreciate the various oxidizing radical or polar radical species that could be used to activate the surface of a substrate. The radical oxidizing and/or polar radical species are formed as a result of the interaction of VUV photons and molecules contained either in an atmosphere of oxygen containing gas, or gas mixtures such as air, air and $H_2O$, $N_2+O_2$, $N_2+H_2O$, or in a hydrogen-containing gas or gas mixture such as: $NH_3$, $H_2$, $N_2+NH_3$, $N_2+H_2$.

Cleaning and activation of the surface to be coated takes place in a reactor at or above atmospheric pressure and under an atmosphere of oxygen-containing gas or gas mixtures. Such a gas or gas mixture can include, for example, air, oxygen, air+$H_2O$, $N_2+O_2$, $N_2+H_2O$, or +$CO_2$. This cleaning and activation step serves to increase the wettability of the moving substrate to a degree that ensures uniform spreading onto the moving substrate of a dispersion solution as described in Step 2. This first step also "decorates" or grafts onto the surface of the substrate oxygen or nitrogen containing groups (e.g., C—OH, C═O, epoxides, amino groups, etc.), which are capable of forming a strong covalent interface with subsequent coatings via dehydration or grafting reactions.

Cleaning and activation are achieved by removal of residual carbon-based organic contaminants from the surface of the moving substrate, which is typically in the form of a continuous strip or discrete panel. Cleaning occurs in conjunction with grafting of oxygen- or nitrogen-containing functional groups (e.g. —OH, C═O, C—O—C), which are covalently attached to a residual carbon and to the outermost surface of the substrate (i.e., activation). Both effects are achieved by exposure of the surface to the combined action of vacuum ultraviolet (VUV) photons and that of oxidizing or polar species, such as ozone, atomic oxygen, amino radicals and hydroxide radicals, which are by-products of absorption of VUV photons by certain common air species, such as oxygen, carbon dioxide, ammonia, and water.

VUV radiation can be generated by a number of non-coherent light sources, based on glow discharges, such as outlined in Table 1, which presents a table of sources of VUV radiation with their corresponding wavelengths. That is, resonant, excimer and halogen rare gas emissions (such as non-coherent energy (e.g., light, plasma) sources. A worker skilled in the relevant art would appreciate the various methods of obtaining VUV of a wavelength between 10 and 200 nm. Non-limiting examples of such methods include plasmas and light sources, such as: Kr resonant, Ar2*, Kr2*, Xe resonant, F2*, Xe2*, ArCl*, ArF*. KrCl*, KrF*, and XeI*, where * indicates an excited dimer (also known as an excimer) or excited complex.

The length of the reactor used in Step 1 depends on a number of factors, namely the initial surface contamination or chemical nature (e.g., initial wettability level) of the substrate to be coated, the wettability level required (e.g., a water contact angle of 5-10°), wavelength and intensity of VUV source used, frontal distance between the VUV source and the substrate, and line speed. The relationship between line speed and the length of the reactor is given below in equation 1:

$$L = v \times t \quad (1)$$

where L is reactor length, v is line speed, and t is reaction time, which is experimentally determined for each situation.

The moving strip of substrate to be coated can be maintained at temperatures between 0° C. and 300° C. It can be placed at a frontal/normal distance of a range of about 2 to about 300 mm from a rectangular lamp array whose dimension along the direction of the strip movement is from about 30 mm to about 300 m. As described previously, the line speed can be set from about 0.1 to about 300 m/min ensuring exposure times of a maximum of about 10 s.

A worker skilled in the relevant art would appreciate that a substrate can be a number of different materials such as, but not limited to metals, Si wafers, glass, polymer films/sheets/fibres, ceramics, composites, paper, or a combination thereof. The coating process 10 of the present invention is a large scale, industrial process which can be used for a continuous (coil-to-coil) coating of flat strip substrates with graphene-like layers. Component 12 of FIG. 1 represents an unwind coil, which is a coil of uncoated substrate. Component 14 represents a take-up coil, which is a coil of coated substrate. Components 5 in FIG. 1 represent rollers that assist the substrate to move through the process. The coating process 10 of the present invention can also be used to coat a number of different types of materials, which can be on a coil-to-coil or a conveyer platform.

In one embodiment of the present invention, the coating process 10 converts GO to r-GO and graphene to produce a graphene-like coating. Conversion of GO to a graphene-like coating occurs once the substrate has been coated by GO. That is, the reduction of GO and the adhesion of the graphene-like coating to the substrate occurs in a single step. The coating process 10 in one embodiment is produced on a continuous coil-to-coil line, 12 and 14, respectively, wherein the coil-to-coil line can move at speeds from about 0.01 to about 300 m/min. The coating process 10 of the present invention allows for formation of a many layered graphene-like coating (i.e., polygranular) that is contacting and that is well adhered to the substrate. The graphene-like coating coats the substrate with multiple monolayers of graphene sheets in a continuous manner. A graphene sheet is a single atomic unit thick monolayer of graphene with atoms arranged in a regular hexagonal pattern. The substrate can be coated with up to 7 to 10 graphene sheet monolayers. A worker skilled in the relevant art would appreciate the maximum number of graphene sheets that can be layered onto a substrate before monolayers convert into graphite.

Preparation of a surface prior to coating it is desirable since doing so augments uniformity of the coating, provides better surface coverage of the coating, augments slidability and wettability of the surface to be coated, decreases or eliminates clumping of the coating composition, controls coating thickness.

The duration of time required for cleaning/activation of a substrate depends on a number of factors, such as: the initial surface contamination level, the wettability level required, the wavelength and intensity of the VUV, the distance from the source of VUV. The cleaning/activation step can be achieved at temperatures from about 0° C. to about 300° C. In certain embodiments, the cleaning/activation step is conducted in a temperature range of about 20° C. to about 50° C. In some embodiments, the cleaning/activation step is conducted at or about at room temperature to slightly above room temperature. The cleaning/activation step can be conducted at a frontal/normal distance of from about 2 to about 300 mm from the substrate, wherein a rectangular lamp array's having dimensions along the direction of the substrate movement from about 0.2 mm to about 300 m. The line speed can be set from about 0.01 to about 300 m/min.

Figure 3A:
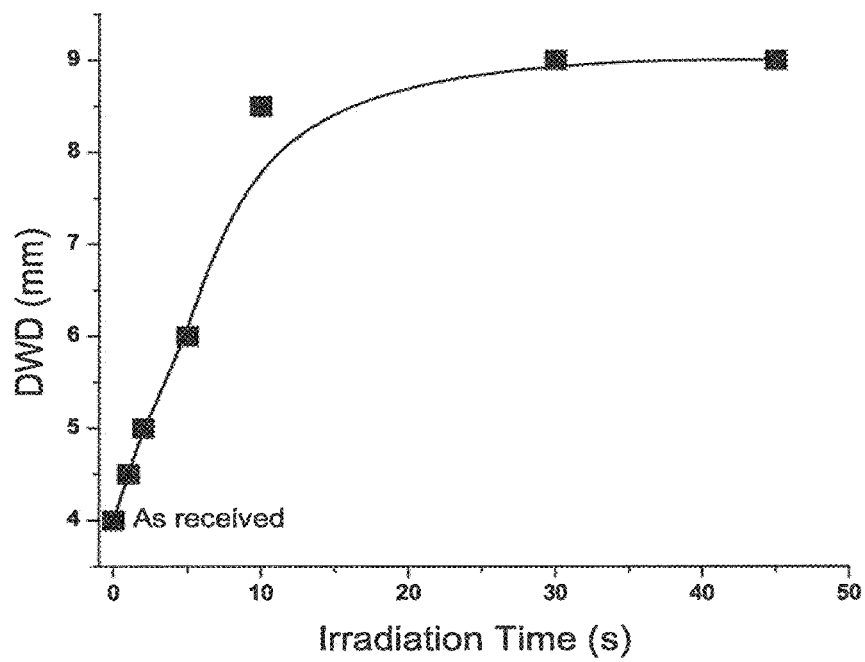
FIG. 3A is a graph showing the diameter of water droplets (DWD), specifically of a 7 μL deionised water droplet, as a function of irradiation time of the substrate (here bright aluminum sheet) surface upon which the droplet was placed.
Figure 3B:
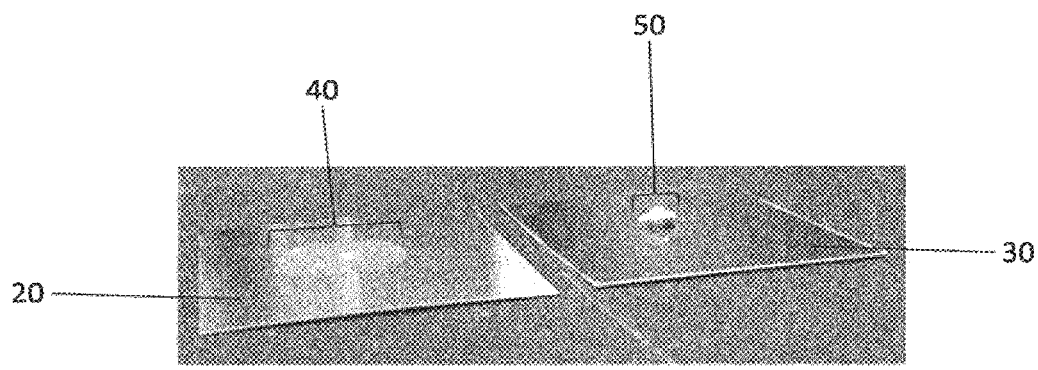
FIG. 3B is a photograph of water droplets placed on post- and pre-cleaned and activated aluminum substrates.

Referring to FIGS. 3 and 4, and according to one embodiment of the present invention, results of cleaning and activation of certain representative examples of substrates are described in greater detail. The cleaning/activation step employed a rectangular array of $Xe_2$ excimer lamps with a wavelength of 172 nm with a dimension in the direction of the moving substrate of 1.7 m. With the use of such an array, the cleaning/activation step was capable of treating a substrate moving at a speed of up to 10 m/min suspended in air while at room temperature and at atmospheric pressure. A worker skilled in the relevant art would appreciate the various energy sources that can be employed during the cleaning/activation step. With specific reference to FIG. 3A, a graph shows the wettability of an aluminium substrate upon exposure to the VUV irradiation associated with the cleaning/activation step. Increased exposure to the cleaning/activation step VUV radiation increases the diameter of a 7 µL water droplet placed on the surface immediately after VUV irradiation, which shows an increase in surface wettability. With specific reference to FIG. 3B and according to one embodiment of the present invention, the picture illustrates the shape of 7 µL water droplets which are placed on a cleaned/activated aluminum substrate 20 and non-cleaned/non-activated aluminum substrate 30. The 7 µL water droplet 40 covers much more surface area on the cleaned/activated aluminum substrate 20 than does a 7 µL water droplet 50 on the non-cleaned/non-activated aluminum substrate 30. A worker skilled in the relevant art would appreciate the various factors that could affect the cleaning, as per this process, of a substrate that is coated on a coil-to-coil or a flat strip.

Step 2: Application of GO Dispersion

Figures 4A, 4B:
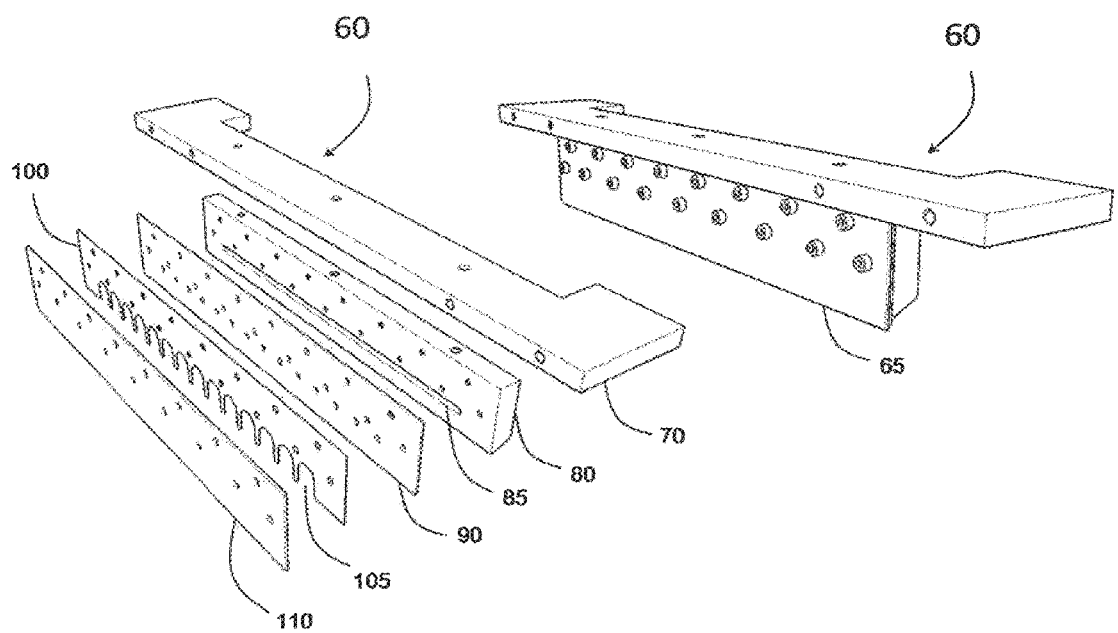
FIG. 4A is perspective view of an electrostatic applicator used in a process according to one embodiment of the present invention.
FIG. 4B is an exploded view of the electrostatic applicator used in a process according to one embodiment of the present invention.

Step 2 of coating process 10 is application of a GO dispersion solution (i.e., GO flakes/platelets suspended in a solvent) onto a cleaned and activated substrate. In FIG. 1, step 2 is conducted using component 2, a precursor applicator. GO flakes/platelets are available through numerous commercial sources or can be produced through numerous processes involving oxidizing and sonicating graphite. A worker skilled in the relevant art would appreciate the various methods of producing GO flakes/platelets. The GO dispersion can be applied in any manner that disposes the liquid onto the surface of the substrate. Such methods may include spraying, spreading, flow coating, electrodeposition, roll-to-roll processing, painting, dipping, casting, applying to a substrate by brush, draw-down bar, ink jets, doctor blades, knives, air knives, immersion, extrusion, heated spraying, lithography, flexography, or ink rollers. In certain embodiments, a spray method is used. Referring to FIGS. 4A and 4B, and according to one embodiment of the present invention, an electrostatic applicator 60, which applies GO dispersion solution onto a substrate, is shown in greater detail. The electrostatic applicator 60 is used to spray the GO flakes/platelets suspended in a suitable solvent or solvent mixture (e.g., concentration of GO flakes per mL could be about 0.02 to about 1.0 mg/mL) onto the activated substrate through spray blade tip 65. More specifically, the concentration of the GO flakes/platelets within the GO dispersion solution can be up to 1 mg/mL. In certain embodiments, a concentration range of from about 0.02 to about 0.5 mg/mL was used. A suitable solvent may be comprised of polar solvents (e.g., ethanol, methanol, water, or a combination thereof). A worker skilled in the relevant art would appreciate the various solvent that may be used to suspend the GO flakes/platelets in the GO dispersion solution. The concentration of the GO flakes/platelets within the GO dispersion solution and the operating parameters for its application on a continuous line ensures that the substrate is completely covered by GO flakes/platelets while assuring that the substrate does not have more than 10 flakes/platelets stacked on a specific location on the substrate. A desired result is a substrate that is coated with a well dispersed, overlapping, very thin coating (e.g., <10 nm) of GO dispersion solution.

With specific reference to FIG. 4B and according to one embodiment of the present invention, the electrostatic applicator 60 is shown in greater detail. The electrostatic applicator is comprised of: a support plate 70; an applicator body 80; applicator body channel 85; back applicator plate 90; gap-setting spacer 100; and, a front applicator plate 1 10. In one embodiment of the invention, the electrostatic applicator consists of two specifically designed nonreactive, electrically conductive applicator plates 90 and 1 10, respectively, separated by a conductive gap-setting spacer 100 of variable thickness. The electrostatic applicator 60 sprays GO dispersion solution onto the substrate to create the well dispersed, overlapping very thin GO flake/platelets coating (e.g., <10 nm). The gap between the electrostatic applicator's 60 two plates 90 and 1 10, respectively, can be adjusted over a range from 2 to 1000 µm using removable chemically inert, electrically conductive gap-setting spacers 100. The length and height of the electrostatic applicator's plates 90 and 1 10 is between 10 and 6000 mm, and 20 and 5000 mm, respectively, depending upon the commercial scale of the line. In some embodiments, a range for the dimensions of the electrostatic applicator 60 are: 50 to 300 µm for the gap setting spacer 100; 10 to 2000 mm for the blade length; and, 100 to 500 mm for the blade height.

A worker skilled in the relevant art would appreciate the various means available in order to modify the electrostatic applicator 60 to spray dilute dispersions of GO flakes/platelets suspended in solvent onto a substrate. Additionally, a worker skilled in the relevant art would appreciate the various non-electrostatic applicator means of applying dilute dispersions of GO flakes/platelets suspended in a solvent onto a substrate such as atomization, and dip-coating.

With further reference to FIGS. 4A and 4B and according to one embodiment of the present invention, the electrostatic applicator 60 can operate at temperatures between 15° C. and 300° C. The preferred range for the purpose of the present invention is 25 to 100° C. The operating temperature is determined by the rheology and electrical properties of the GO dispersion solution. In one embodiment of the present invention, 3 feed ports (not shown) and 50 spray arcs 105 are used to ensure optimum spraying uniformity and coating across a substrate up to 2 m wide. The electrostatic applicator 60 feed rate of the GO dispersion solution can be in the range of 5 and 500 mL/min/linear m, and can be set as high as 1000 mL/min/linear m. The voltage applied to the blade of the electrostatic applicator 60 during the spraying of the GO dispersion solution is between 1 and 200 kV. More specifically, good results were obtained with the applied voltage between 50 and 120 kV. One to five spray applicators can be lined up in sequence, according to one embodiment of the present invention. The number of spray applicators can be increased to 20 in order to accommodate for the speed at which the substrate travels under the spray blades and the desired thickness of the dispersion being applied. In one embodiment of the present invention, a range of 1 to 5 blades is sufficient to achieve a proper coating of a substrate at a speed of about 0.1 to about 100 m/min.

Step 3: Drying

With reference to FIG. 1 and according to one embodiment of the present invention, Step 3 in the coating process 10 is a drying step. In FIG. 1, step 3 is conducted using component 3, a dryer. The purpose of this step is to remove most of the solvent carrier from the GO films without causing additional chemical or structural changes. The substrates coated with wet GO dispersion solution are conveyed through a dryer (oven or air/$N_2$ knives) having up to a suggested length of 600 m and at moderate temperatures ranging between 50-140° C. in an inert $N_2$ atmosphere. The purpose of this step is to remove most of the solvent from the GO dispersion solution coatings without causing chemical or structural changes to the substrate surface or to the GO flakes/platelets. The drying time for a substrate coated with GO dispersion solution is dependent on certain factors such as dryer temperature, a substrate's physical dimensions, line speed, and the amount of surface coverage of the substrate with the GO dispersion solution. In one embodiment of the present invention wherein the steps of the coating process 10 are conducted in line, the length of the dryer will be dependent on the line speed, and the initial weight of the wet GO dispersion solution coatings. As an example a line speed of 10 m/min would require a dryer having a length of 5 meters operating at 80° C. under purge of dry nitrogen having a gas flow rate of 20 slm.

Step 4A: Conversion of GO into r-GO and Graphene Thereby Forming a Graphene-Like Coating With reference to FIG. 1 and according to one embodiment of the present invention, step four of the coating process 10 is the conversion of GO into r-GO and graphene thereby forming a graphene-like coating. In FIG. 1, steps 4A and 4B are conducted using component 4, a conversion reactor. Graphene-like coating is comprised of r-GO and graphene in various ratios. The ratio of r-GO/graphene is dependent on the strength of the conversion reaction and conversion time. The conversion step consists of chemically converting the dry GO flake/platelets on the substrate to graphene sheets that when combined, cover the substrate to form a graphene-like coating. The conversion of GO into r-GO and graphene coating is achieved through VUV radiation by irradiation using VUV sources of wavelengths of 10-200 nm under an inert $N_2$ atmosphere. VUV radiation can use a number of other non-coherent light sources as described in Table 1. A worker skilled in the relevant art would appreciate the various irradiation mechanisms which may be employed to chemically convert the GO flake/platelets to graphene-like coating, such as variable VUV wavelengths, use of inert ($N_2$, $N_2+CH_4$, $N_2+C_2H_4$), or reducing atmospheres ($N_2+H_2$). The VUV radiation leads to: the removal of O-containing moieties contained in the GO molecular structure (de-oxygenation); and, to the subsequent material reorganization (i.e., recombination of residual dangling bonds) to produce graphene-like structures. Step 4 requires the use of a conversion reactor.

Step 4B: Repairing Coating Imperfections

It has been shown herein that small volumes of $H_2$ and/or $CH_4$ gases, or combinations thereof at low concentrations can be added in mixtures with inert gas such as, for example, nitrogen in order to improve process conversion kinetics and/or to heal the graphene structure thereby improving coating properties along with increasing long term stability. VUV-assisted reduction in dry $N_2$ reduced the concentration of defects.

In one embodiment of the present invention, the conversion reactor utilised in Step 4A had an atmosphere of dry nitrogen with a concentration of 99.993% purity, or better, at atmospheric or slightly above atmospheric pressures. The conversion reactor was purged by a $N_2$ gas flow at rates of up 200 slm for 1 to 60 min prior to line operation. As an example, a 20 slm of $N_2$ of 99.998% purity is used for 10 min prior to running the substrate, after which a $N_2$ flow rate of 5 slm maintained the residual oxygen content inside the conversion reactor at a minimum. The GO flake/platelets coated substrate was conveyed through the conversion reactor at temperatures between 0 and 140° and at a frontal distance of 2 to 300 mm from a rectangular lamp array. In one embodiment of the present invention, where the coating process 10 is on a coil-to-coil or on a conveyer, the substrate was maintained at temperatures between 0 and 140° C., and placed at a frontal distance of 2 to 300 mm from a rectangular lamp array having dimensions between 0.2 mm and 150 mm positioned along the movement direction of the substrate and its length. In one embodiment of the present invention a conversion reactor would use a rectangular array of $Xe_2*$ lamps ($\lambda=172$ nm) with the length in the direction of the moving substrate of 1.7 m. This conversion reactor was capable of treating a substrate moving at 10 m/min at room temperature and at an atmospheric pressure under a purge of 5 slm of dry $N_2$.

Figure 6:
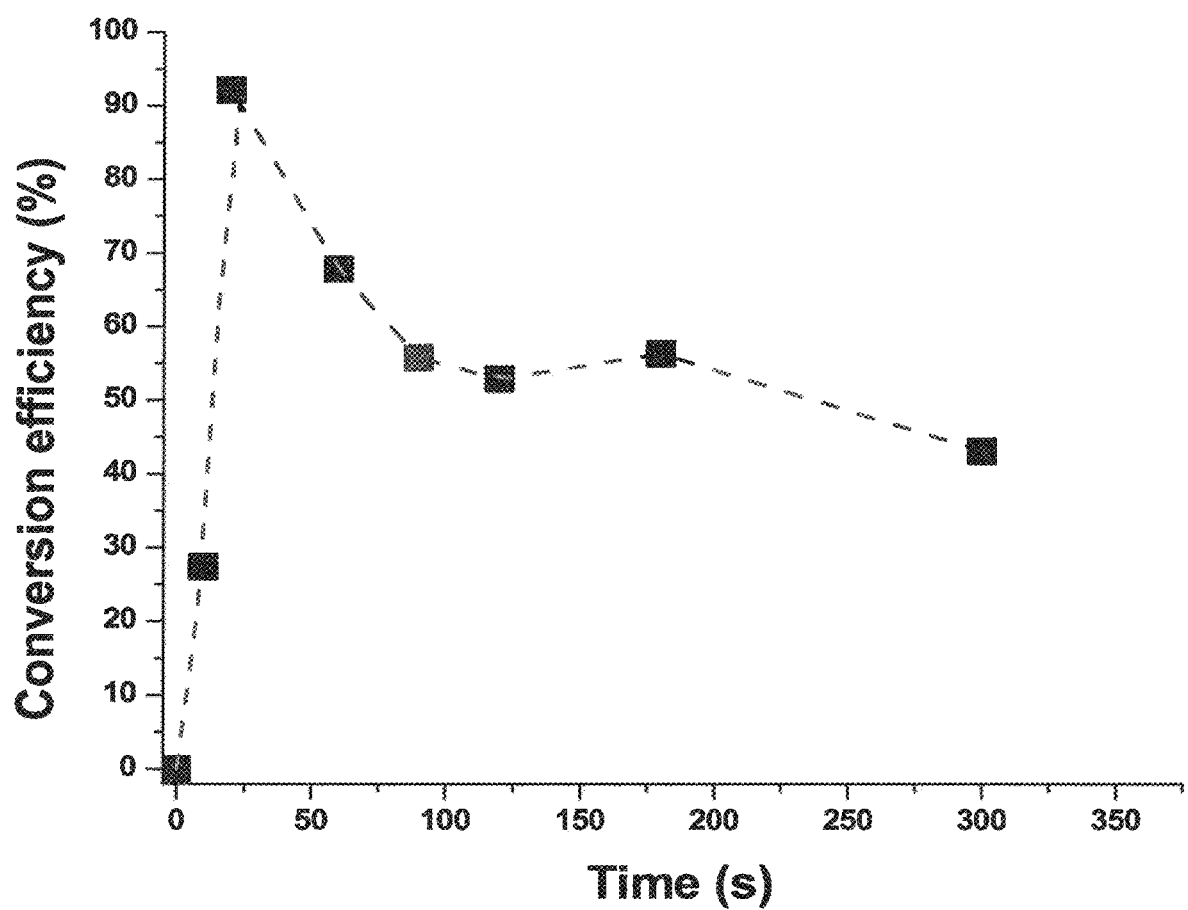
FIG. 6 is a graph of the conversion efficiency of GO to r-GO and graphene on a Al substrate as a function of irradiation time as measured by X-ray photoelectron spectroscopy.
Figure 7:
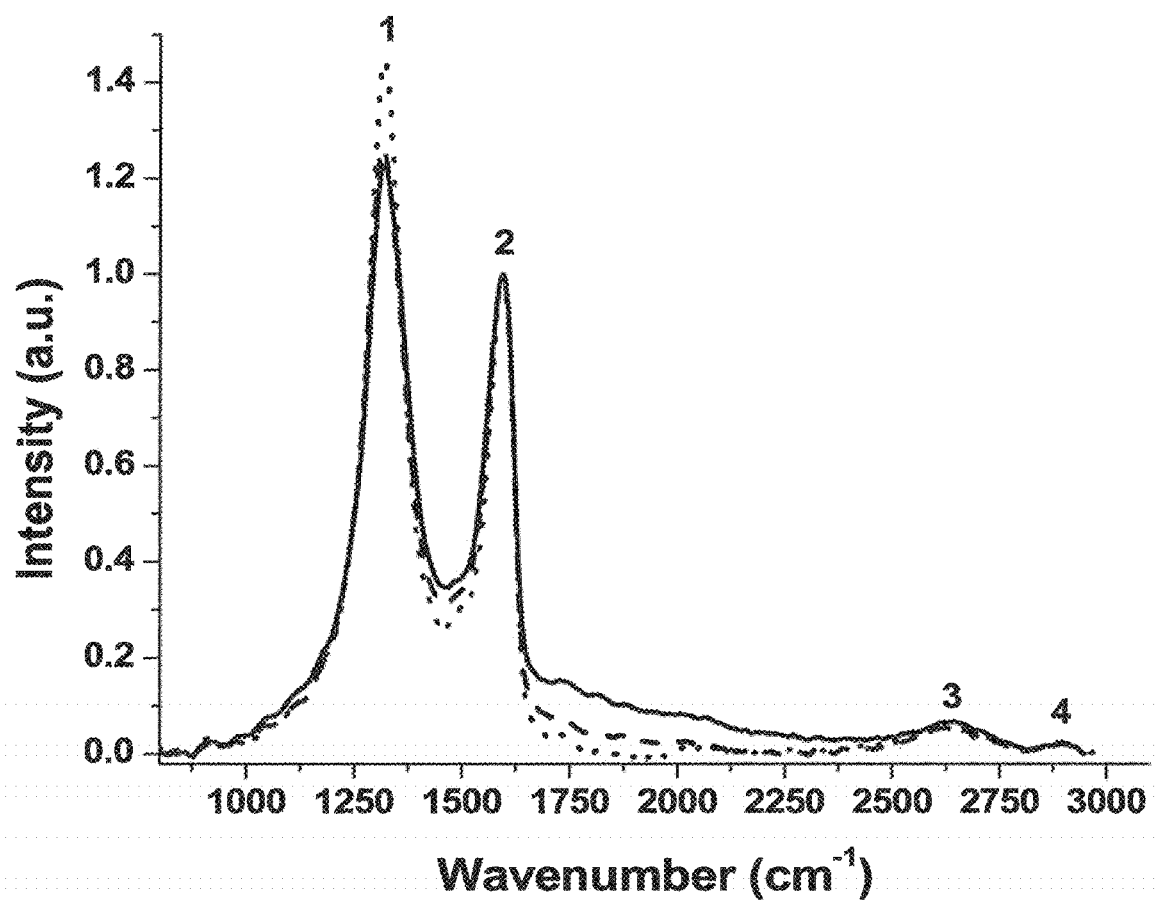
FIG. 7 is a Raman spectra graph of GO flakes/platelets (solid line) and two graphene-like coatings (sample 1, dashed line) (sample 2, dotted line) obtained by coating Si wafers using a spray method and irradiation using a λ=172 nm Xe excimer lamp, where D mode is in region 1, G mode is in region 2, 2D mode is in region 3, and G+D mode is in region 4.
Figure 8:
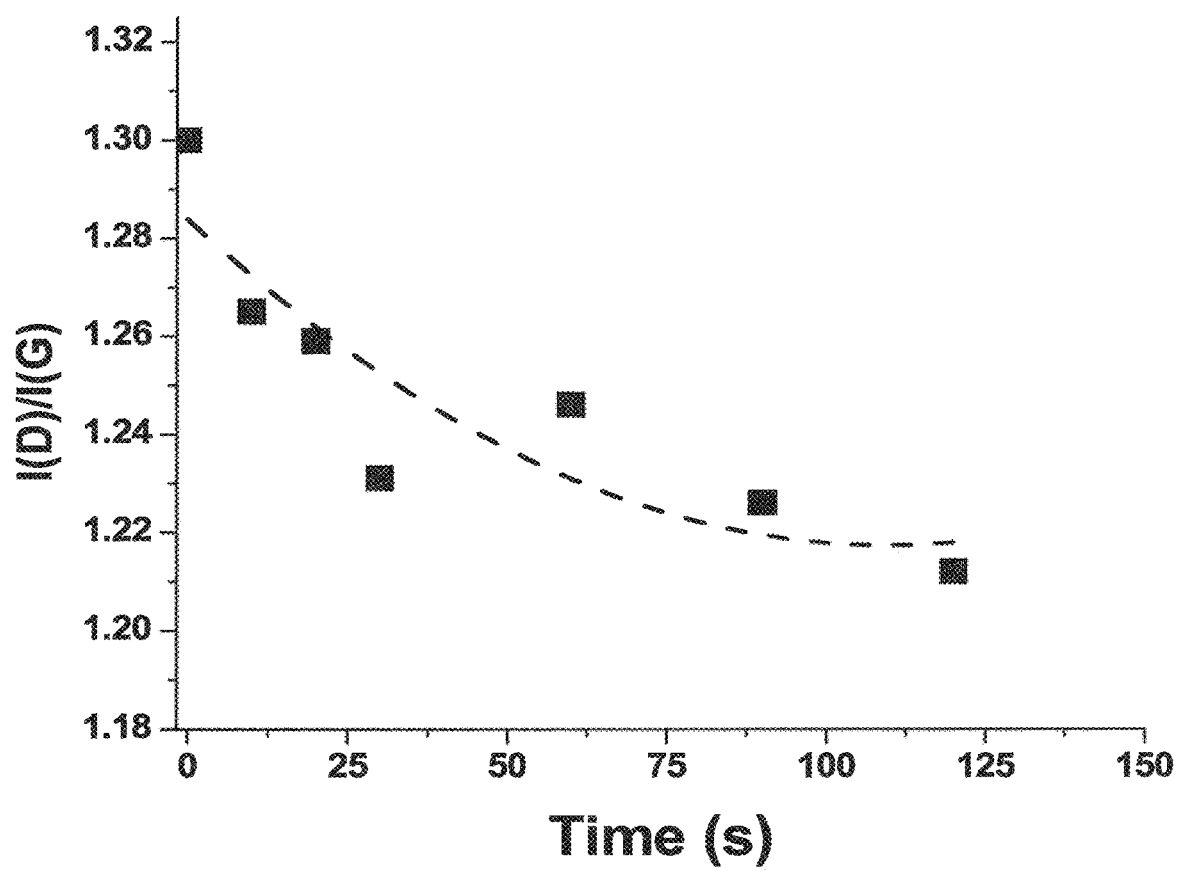
FIG. 8 is a graph of a disorder gauge, I(D)/I(G) determined using Raman Spectroscopy data of the graphene-like coating, mapping the evolution of defects, including overlapping edges of r-GO platelets with the irradiation time.

Referring to FIGS. 6, 7, and 8, and according to one embodiment of the present invention, in the coating process 10, the conversion of GO flakes/platelets into graphene sheets and the resultant graphene-like coating is shown in greater detail. The removal of the oxygen from the GO reorganizes the carbon structure, forming graphene sheets, and the resultant graphene-like coating on the substrate. FIGS. 6, 7, and 8 further describe the conversion efficiency. With specific reference to FIG. 6, the conversion efficiency is shown as a function of irradiation time of the substrate: where the conversion efficiency is defined as % of oxygen removed as a result of the conversion process relative to the initial oxygen concentration; and, where the atomic concentrations were determined using XPS spectra. As can be seen in the graph in FIG. 6, the conversion efficiency was determined to be as high as 90% for treatment durations between 10 to 25 seconds.

Referring to FIG. 7, Raman Spectroscopy measurements were graphed to show that the graphene-like coatings were indeed formed. Raman spectroscopy measurement identified several banks/peaks that were characteristic of graphene-like structures. Graphene-like structures were identified at D band around 1300 $cm^{-1}$, G band around 1580 $cm^{-1}$, and 2D band around 2700 $cm^{-1}$. Raman spectra of a GO coating (black) and two graphene-like coatings used within the coating process (red and blue) were assessed to obtain quantification of an amount of defects. Referring to FIG. 8, a disorder gauge was graphed based on Raman Spectroscopy measurements. The ratio I(D)/I(G), also called the "disorder gauge", gave an indication of the presence of defects in the graphene sheets. A low value meant lower concentration of defects.

FIG. 8 shows the evolution of the I(D)/I(G) ratio with the conversion (irradiation) time. VUV-assisted reduction in dry $N_2$ reduced the concentration of defects, most probably due to the de-oxygenation followed by bond reorganization within the remaining material. The disorder gauge does indicate the presence of some defects in the coating, most probably due to their characteristic structure of overlapping graphene sheets and their associated edges which are formed from the conversion of GO flakes/platelets. In addition, the disorder gauge also indicates that the resultant graphene-like coatings are multi-layered. The multi-layers of graphene-like coatings do not exceed 10 layers.

Figure 9A:
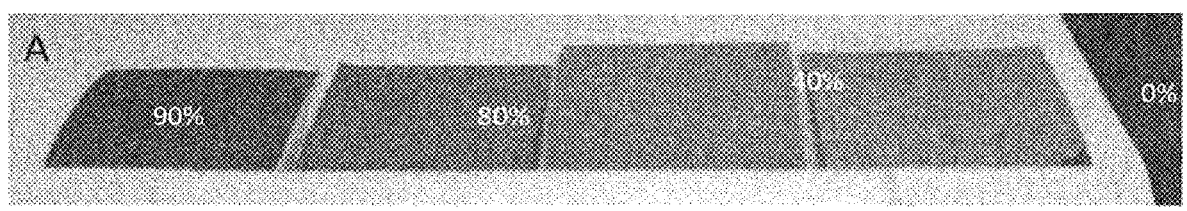
FIGS. 9A and 9B are photographs showing corrosion behaviour after 2 hrs (A) or 5 hrs (B) immersion in 5% NaCl and 5% H2O2 solutions at room temperature for aluminum having the indicated amounts of surface coverage with graphene-like coatings.
Figure 9B:
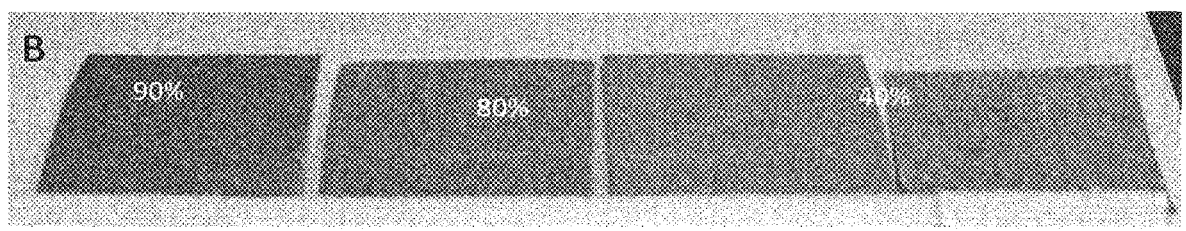

Referring to FIGS. 9A and 9B, and according to one embodiment of the present invention, corrosion behaviour of aluminum coupons coated with graphene coatings of various thicknesses is shown in greater detail. Graphene-like coatings demonstrate excellent capability for corrosion protection. FIG. 9 is a photograph of aluminum substrates coated with various layers of graphene-like coatings. Graphene-like coated aluminum substrates were immersed in 5% NaCl 5% $H_2O_2$ solutions at room temperature for 2 and 5 hours, respectively. As can be seen in FIG. 9, graphene-like coating were excellent diffusion barriers and protected substrates against corrosion. Graphene-like coating at sufficient thickness can coat the aluminum substrate's surface and effectively protect the substrate from corrosion. For thinner graphene-like coatings, the aluminum substrate was not completely covered and showed signs of corrosion upon exposure to 5% NaCl 5% $H_2O_2$ solutions.

Figure 10A:
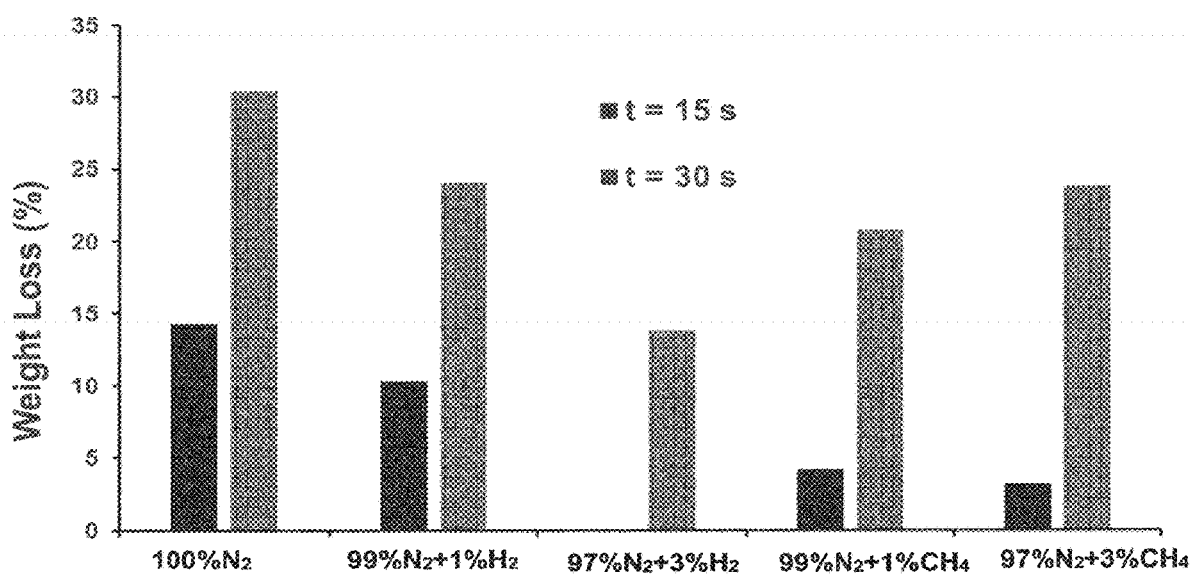
FIG. 10A shows a plot of weight loss in the GO material as a result of VUV irradiation under the stated atmospheres for time periods of 15 s (black bars) and 30 s (grey bars).

Some properties of graphene (e.g., thermal, electrical conductivities) are dependent on the density of defects present in the structure of the flakes. Defects may be due to misshaped graphene structures and carbon vacancies created during a reduction process (V. Lopez, et al., Adv. Mater. 21, 4683-4686 (2009)). VUV irradiation of GO films under certain atmospheres (e.g., inert atmosphere, mixtures of inert atmosphere and hydrocarbon) has previously been shown to augment the orderliness of the carbon network of the r-GO platelets. Studies to reduce the amount of defects in the herein described graphene-like coatings were conducted and are described in Example 6. In brief, it was possible to dramatically reduce the amount of defects, as shown in FIGS. 10A and B.

Step 4C: Functionalizing Graphene-Like Coatings r-GO materials have been functionalized by physisorption of functional moieties. Such functional moieties include: polymers, polymeric fragments or small molecules. Physisorption occurred on the materials' basal plane via non-covalent forces (e.g., π-π stacking, van der Waals interactions, etc.) between the functional moieties and the r-GO material. (Covalent functionalization of reduced graphene oxide is rare, but when they are reported, this type of bonding is achieved via wet chemistry such as reaction of GO molecules with liquid reactants.) Functionalization is usually performed in order to graft onto a surface various "functional" groups. Such modification makes it possible for graphene layers or platelets to participate in covalent chemical reactions with other materials forming composite materials. Such modification also makes it possible for the modified GO materials to possess certain advantageous characteristics. For example, such characteristics may include specific detection of $NO_2$ gas, or hydrophobic behavior.

Irradiation using VUV photons under reduced pressure (e.g., vacuum) or under inert atmospheres (e.g., $Ar_{(g)}$, $N_{2(9)}$, $He_{(9)}$) that include small amounts of reactive gases can achieve covalent functionalization of many organic materials, including r-GO layers. Such reactive gases include polar moieties such as, for example, C—O, C=O, —COO, —C-halo, N—H, C—P, P—O—P, P=O, or combinations thereof). The reactive gases can be used to graft polar groups on the r-GO. Reactive gases or hydrocarbons that include apolar moieties, such as, for example, C=C, C—N, C—H, C—S, or a combination thereof) can be used to graft apolar groups on the r-GO surfaces. Polymerizable gases (e.g., hexamethyldisiloxane, HMDSO, tetraethyl orthosilicate, TEOS, titanium ethoxide, titanium isopropoxide, or a combination thereof) can also be used in the VUV-induced reduction and polymerization step to form r-GO-polymer composite materials.

Functionalization of graphene-like coatings by exposing the r-GO to fluorocarbons is expected to allow for modified graphene-like coatings that possess the characteristics of hydrophobicity, low friction coefficients, and/or very low-surface energies. As a representative example of a functionalized graphene-like coating, an r-GO-F coatings was prepared and characterized herein (see Example 8). In a non-limiting example described herein, $C_3F_6$ gas was used to functionalize a graphene-like coating; however, a person skilled in the art of the invention would appreciate that many different gases or vapours can be mixed within a $N_2$ purge during VUV irradiation in order to functionalize the surfaces of GO films with either polar non-polar groups, or with polymeric chains fragments. The inventors envision using, for example, ethylene, benzene, ammonia, HMDSO, titanium isopropoxide, titanium tetrachloride. As described herein, surface wettability of the $C_3F_6$ r-GO-F coating was investigated by placing de-ionized water droplets of set volumes (7 μL, as measured by calibrated micro-pipette) and measuring the diameter (in mm) of these water droplets on photographs taken using a microscope coupled with a digital camera (see FIG. 3B for an example). DWD values for the r-GO-F coatings compared to those obtained on coatings obtained under similar irradiation conditions but under an atmosphere of $N_2$ or of a mixture of $N_2$ and $CH_4$. It was shown that the surfaces of r-GO-F coatings were hydrophobic, even more hydrophobic than a polystyrene control. See Table 3 for CE data for graphene-like coatings as a function of gas composition present during VUV irradiation of the dry GO coating.

Uses of Graphene-Like Coatings

Graphene-like coatings as described herein have promising applications in numerous areas, such as electrically conductive coatings or for application for tunable electric conduction to be used. Examples of products that could include parts or surfaces that benefit from such coatings are: Li-ion battery electrode materials, other energy storage devices, supercapacitors, EMI shielding applications, transparent electronics, flexible electronics, nanoelectronics, nanogenerators, solar cells, fuel cells, hydrogen storage, photodetectors, OLED (organic light emitting diodes), displays, a product that is electrically conductive, a tunable electric conduction device, a lithium-ion battery electrode, an energy storage device, a supercapacitor, an EMI (electromagnetic induction) shield, electronic displays, solid lubricants, or diffusion barriers.

Functionalized graphene coatings may be useful for products in the fields of: surface modification of implants or scaffold materials in tissue engineering, protection films in biological and corrosive environments, drug delivery, gene therapy, cancer therapy, bio-sensors, electrochemical bio-sensors, contact sensors, nanoelectromechanical sensors, chemical sensors, non-contact sensors, and other types of sensors.

Graphene-like or functionalized graphene coatings may be used for corrosion protection coatings for metals and other materials, water-repellant and anti-fouling coatings, solid lubricants, diffusion barriers, and adhesion-promoting layers.

The following working examples further illustrate the present invention and are not intended to be limiting in any respect. Those skilled in the art will gain a further and better understanding of the present invention and the new results and advantages thereof from the following illustrative examples of the practice of this invention as it has actually been carried out experimentally. Although the coating process 10 has been described above by reference to certain embodiments of the process, the process is not limited to the embodiments described above. Modifications and variations of the embodiments described above will occur to those skilled in the art in light of the above teachings. Moreover, with respect to the above description, it is to be repulsed that the optimum dimensional relationships for the component members as used in this process may include variations in size, material, shape, form, function and manner of operation.

Working Examples

Example 1

Cleaning and Activation

A cleaning and activating experiment was conducted that used an $Xe_2^*$ excimer lamp (product L12530-01 available from Hamamatsu of Hamamatsu City, Japan) that emitted a narrow, nearly-monochromatic VUV radiation centred at $\lambda=172$ nm, with an intensity of $I=15$ $mW/cm^2$ measured at the sample's position (10 mm away from the lamp) under atmospheric conditions using a VUV Hamamatsu sensor (product H9535-172) coupled with a Hamamatsu power meter (product C9536). Surfaces of bright Al sheet were irradiated in air at atmospheric pressure and room temperature. Changes in surface wettability were then measured. Using a calibrated micro-pipette, water droplets of set volumes (7 µL) were placed on coated substrates. The diameter (in mm) of these water droplets were determined using photographs of them that were taken using a microscope coupled with a digital camera. Because the water droplet volume was kept constant, the diameter increase is due to a decrease in the contact angle of the water droplets (see FIG. 3B). The values for DWD, as a function of irradiation time are plotted in FIG. 3A and show that the wettability of the bright Al sheet increases almost linearly with increasing the irradiation time for durations up to 10 s of VUV exposure. For longer treatment times, the surface wettability was maximized, which corresponds to WCA of almost 0° (see the left photograph in FIG. 3B).

Example 2

Application of a GO Dispersion

In this study, GO dispersions were applied to the surface of a moving strip of aluminum. The application used an electrostatic applicator (see FIGS. 4A and 4B) that included two specially designed nonreactive, electrically conductive plates. The plates were separated by a conductive spacer of variable thickness. The electrostatic applicator sprayed dilute dispersions of GO flakes/platelets onto a moving strip. Such spraying created a film that was a well dispersed, overlapping, very thin layer (<10 nm) of GO flakes/platelets. GO flakes were suspended in a suitable solvent or solvent mixture. Polar solvents are appropriate choices (e.g., ethanol, methanol and water). The concentration of the GO flakes within the dispersion can be up to 1 mg/mL. In certain embodiments, the concentration range was determined to be from about 0.02 to about 0.5 mg/mL. The gap between the applicator's two plates can be adjusted over a range from 2 to 1000 µm using removable, chemically inert, electrically conductive spacers. The length and height of the plates was between 10 and 6000 mm, and 20 and 5000 mm, respectively. Preferred value ranges for the dimensions of the applicator were 50 to 300 µm for the blade gap, 10 to 2000 mm for the blade length, and 100 to 500 mm for the blade height.

The applicator operates at temperatures between 15° C. and 300° C. In certain embodiments, the range was 25 to 100° C.; however the value will be influenced by the rheology and electrical properties of the GO-laden suspension. In a typical embodiment, 50 feed ports would be set up in order to ensure optimum spraying uniformity and coating weight across a substrate/coil that is 2 m wide; we have used up to 10 feed ports. The applicator can use precursor (i.e., GO dispersion) feed rates of up to 1000 mL/min/linear m; however, the values used here were set between 5 and 500 mL/min/linear m. The voltage applied to the blade during the spraying can be varied between 1 and 200 kV. Good results were obtained when applied voltage was between 50 and 120 kV. The number of spray blades can be increased to up to 20 units in order to accommodate for a line speed increase. For studies described herein up to 1 to 5 applicator units were sufficient.

Figure 5:
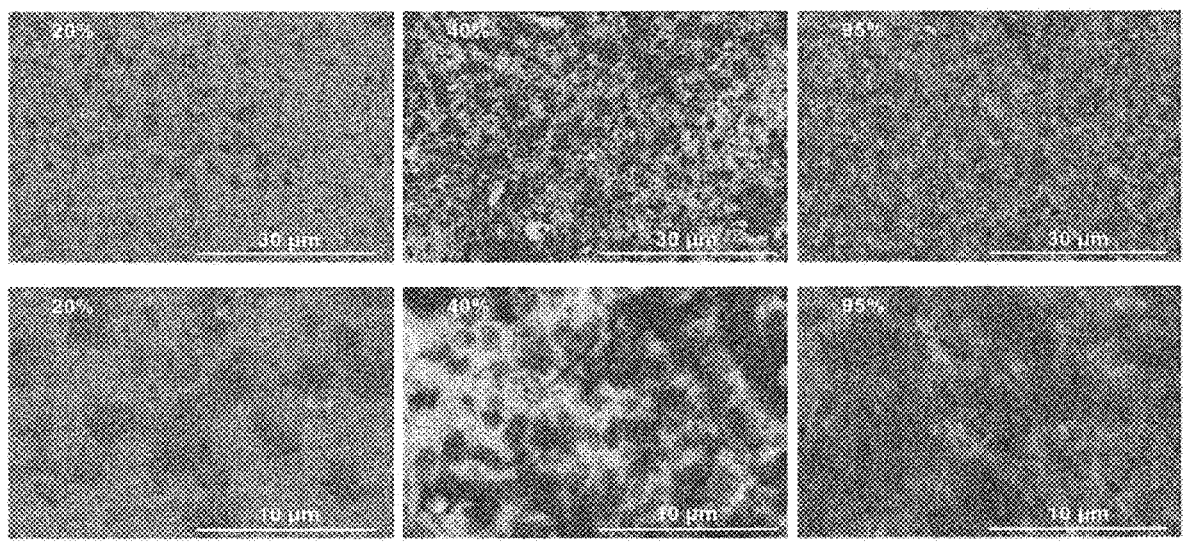
FIG. 5 is a series of SEM images showing coating morphology at the stated magnification levels and the stated surface coverage amounts (20, 40 and 95%) on the surface of a bright Al sheet coated with the graphene-like coating described herein.

This applicator produces films of a polygranular structure, where platelets of GO were laid down flat on substrates. Occasionally, GO platelets overlap when substrate surface coverage was increased. FIG. 5 illustrates coating morphologies for GO films that were deposited on bright Al sheet at varying thicknesses and surface coverage values. These films were imaged using SEM (JEOL JSM-5800 instrument, available from JEOL of Tokyo, Japan) operated at 10 or 20 kV. The pictures of FIG. 5 show various magnifications, which were acquired to quantify surface coverage and study flake morphology.

These films are termed "polygranular", as they are unlike the CVD-deposited graphene layers, known to be generally defect-free and one atomic layer thick (~1 nm). In contrast, these films were formed of distinct and overlapping GO or graphene platelets. In the case of nearly complete surface coverage, the average thickness of these films can be as high as 4 to 5 atomic layers (see FIG. 5).

Example 3

Drying of a GO Dispersion-Coated Substrate

A dryer (oven) of maximum 600 m in length was used to dry the coated substrate at moderate temperatures (~50-140° C.) under an inert $N_2$ atmosphere. The necessary length of the dryer depends on the line speed, and the initial weight of the wet GO films: for example a line moving at the speed of 10 m/min requires a 5 m long dryer operating at 80° C. under 5-20 slm purge of dry nitrogen.

Example 4

Chemical Reduction/Conversion

A GO film has been chemically converted to a graphene-like film using VUV radiation under an inert $N_2$ atmosphere. That is, via exposure to VUV photons of the same wavelength as discussed in step 1 (e.g., 172 nm), or of a different wavelength in the 10 to 200 nm range (see Table 1), GO films were converted to graphene-like films. Such irradiation led to a decrease in or substantial removal of O-containing moieties from the GO (i.e., de-oxygenation), and to material reorganization (i.e, recombination of residual dangling bonds) and produced graphene-like structures.

The gas used in the conversion reactor was dry nitrogen of 99.98 to 99.9999% purity or better, at atmospheric or slightly above atmospheric pressures. The reactor is purged by $N_2$ gas flow rates of up 200 slm for 1 to 60 min prior to line operation. A moving strip was maintained at a temperature between 0 and 140° C., and placed at a frontal distance of 2 to 300 mm from a rectangular lamp array whose dimension along the direction of the movement was between 0.2 mm and 150 m. Specifically, flow rates of 20 slm of $N_2$ of 99.998% purity for 10 min were used, after which the $N_2$ flow rate was reduced to 5 slm which was found to be enough to maintain the residual oxygen content inside the conversion reactor to a minimum value of below 200 ppm. Our conversion reactor used a rectangular $Xe_2^*$ lamp ($\lambda$=172 nm) from Hamamatsu (L12530-01) with a nominal intensity of I=50 mW/cm$^2$ measured on the lamp's window.

Example 5

Characterization of Graphene-Like Coatings

Elemental Compositions

Surface elemental compositions were evaluated using X-ray Photoelectron Spectroscopy (XPS). The XPS spectra were measured on a Microlab 310-F spectrometer from VG Scientific equipped with an XR-4 twin anode (Al/Mg). The samples were mounted on a stainless steel holder using double-sided adhesive Cu tape and kept under high vacuum ($10^{-8}$ mbar) overnight inside the preparation chamber before they were transferred into the analysis chamber ($10^{-9}$ mbar) of the spectrometer. The XPS spectra were collected using MgK$\alpha$ radiation at 1253.6 eV (280 W, 14 kV) and a spherical sector analyzer (SSA) operating in CAE (constant analyzer energy) mode. Binding energies are referred to the C1s peak at 285 eV. Survey spectra were recorded from 0 to 1000 eV at a pass energy of 40 eV, averaged over 5 scans using an energy step size of 2 eV. For each sample, survey spectra at three sample positions were measured, each analyzed area being about 5×2 mm$^2$. The spectra were processed using the Avantage software. The data were corrected for energy shifts due to charging of the sample under the influence of the X-rays and the spectra were corrected for background using the Shirley algorithm. For the quantification the relative sensitivity factors (Scofield) were taken into account.

Conversion Efficiency

The conversion efficiency was calculated using:

$$CE\ (\%)=100\times([O]_i-[O]_t)/[O]_i \qquad (2)$$

where $[O]_i$ and $[O]_t$ represent the values of oxygen concentration present in the film initially, and after a certain irradiation duration, t, respectively. FIG. 6 shows a plot of conversion efficiency of GO to r-GO and graphene on a substrate as a function of irradiation time. This conversion efficiency can be calculated using surface elemental concentrations determined using X-ray Photoelectron Spectroscopy (XPS). FIG. 6 shows that the conversion efficiency, i.e. proportion of removed oxygen from the GO coatings relative to the initial O, of GO films deposited on surfaces of Si wafers was as high as 90% for treatment durations in the range of 10 s to 25 s.

Raman Spectroscopy

Raman spectroscopy measurements showed several bands/peaks, which are characteristic of graphene structures. Raman spectra were measured on coated samples using a Horiba Jobin Yvon LabRam equipped with an Olympus BX41 optical microscope. The wavelength of the laser was 632.8 nm, and spectra were recorded between 3000 and 600 cm$^{-1}$ with a resolution of 3 cm$^{-1}$. The background was subtracted using the LabSpec 5 software suite and straight lines. The D (disorder) peak of GO located at 1352 cm$^{-1}$ and at 1350 cm$^{-1}$ for rGO streams from a defect-induced breathing mode of sp$^2$ rings (C. Ferrari et al., Phys. Rev. B 61(20), 14095-14107 (2000). See FIG. 7 for details. The D peak is common to all sp$^2$ carbon lattice, and arises from the stretching of C—C bond. The G peak is located at around 1600 cm$^{-1}$ for GO and at 1599 cm$^{-1}$ for rGO and is due to the first order scattering of the E2g phonon of sp$^2$ C atoms.

Example 6

Strategies to Decrease Defects and Improve Quality of Graphene-Like Films

FIG. 7 indicates that graphene-like coatings described herein were multi-layered (e.g., less than 10 atomic layers) and had defects. Such defects may be due to their characteristic structure of overlapping platelets/flakes and their associated edges. Intensity of the D band can help to quantify the amount of defects since it pertains to the size of the in-plane sp$^2$ domains (Y. Guo et al., Carbon 50(7), 2513-2523 (2012). The increase of the D peak intensity indicates the formation of more sp$^2$ domains. The relative intensity ratio (I(D)/I(G)) of these peaks, also known as the disorder gauge, is a measure of the degree of disorder. This ratio is inversely proportional to the average size of the sp$^2$ clusters, as well as any other deviation from ordered lattices of sp$^2$ carbon bonds (O. Akhavan et al., Carbon 50(5), 1853-1860 (2012). For example, such disorder may be caused by the presence of residual carbon-oxygen bonds, deformed C—C bonds, "holes" left in the structure by residual C radicals, or similar features.

FIG. 8 shows the evolution of the I(D)/I(G) ratio as a function of conversion time observed in the case of GO films deposited on Si wafers and irradiated under a continuous $N_2$ purge of 20 slm using a $Xe_2^*$ lamp ($\lambda$=172 nm) from Hamamatsu Photonics (L12530-01) having an intensity of I=40 mW/cm$^2$ measured at the sample's position As it can be seen, reducing GO using VUV under dry $N_2$ atmosphere decreased the amount of defects. This decrease was considered to be due to de-oxygenation, followed by bond reorganization within the material.

Residual oxygen and water vapour in the conversion reactor was considered responsible for the GO etching, and thus for creating additional defects, such as carbon vacancies and residual O-containing groups. In order to minimize GO material etching during the VUV-assisted process, small amounts (up to 4%) of Ultra Pure, UHP (99.999% pure) $H_2$ gas (from Linde Canada) were added to the $N_2$ gas purge.

Etching can be quantified by measuring the weight loss of the graphene-like films after exposure to the VUV source. A Mettler Toledo MX5 microbalance was used with a precision of 0.001 mg to measure the weight of the film before and after the reduction process. The difference between the two values relative to the initial value represents the % weight loss, and is indicative of the material etching. A plot of weight loss in the GO material as a result of VUV irradiation under various atmospheres and for two time periods is presented in FIG. 10A. As it can be seen, the weight loss (etching) of the GO films decreased with increasing the concentration of $H_2$ for both irradiation times; this is most probably due to the fact that $H_2$ and H* radicals are quenching the residual 0- and water-species and their associated radicals created under the action of VUV photons.

Reduced etching during the VUV-assisted process translated into better quality graphene coatings, as indicated by the Raman results presented in FIG. 8. Comparing I(D)/I(G) values for the films obtained under different experimental conditions showed that the density of defects decreased for the r-GO films reduced under $N_2+H_2$ atmosphere compared with those reduced under pure $N_2$.

Figure 10B:
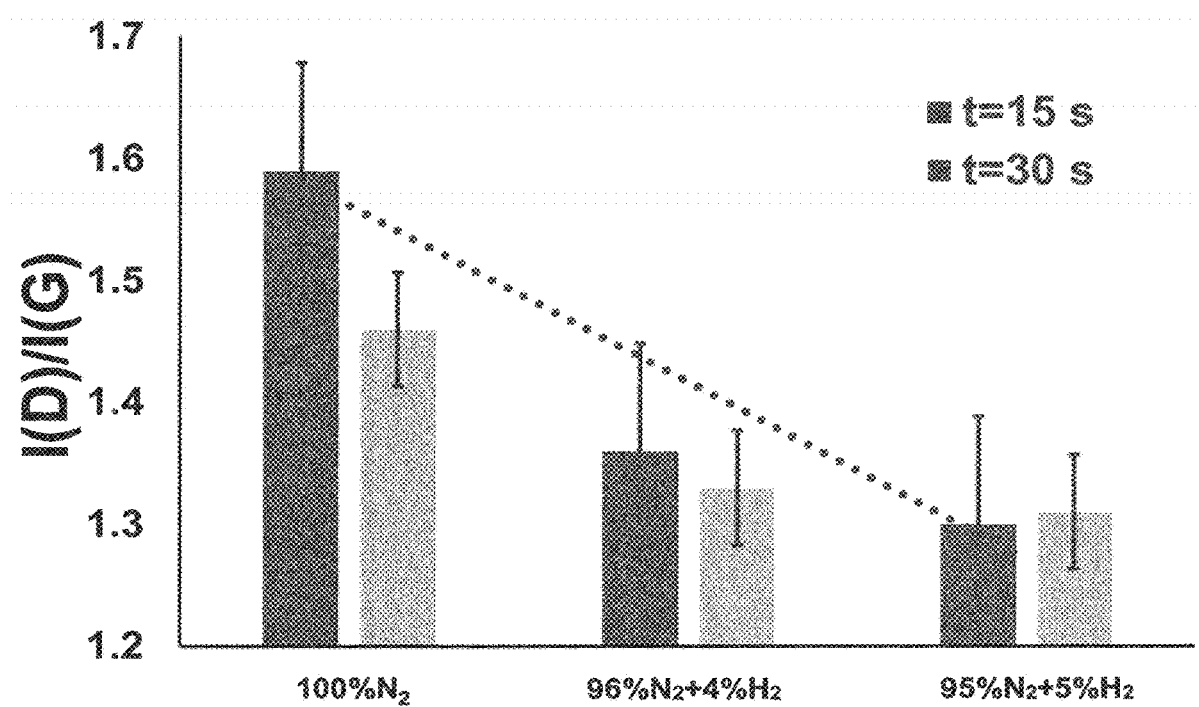
FIG. 10B shows a graph of a Raman Spectroscopy disorder gauge, I(D)/I(G), of the graphene-like coating for samples irradiated for 15 and 30 s under the stated atmospheres.

Another strategy for improving the quality of graphene films is to provide a carbon radical source during, or as a separate step, after the VUV-assisted reduction process. C radicals will graft in places where there are imperfections, such as vacancies or distortions in the $sp^2$ domains, thereby reducing the density of defects. Many hydrocarbons decompose under the action of VUV photons (H. Okabe, "Photochemistry of Small Molecules", John Wiley & Sons Inc., New Jersey, USA (1978); F. Truica-Marasescu, et al., Plasma Process. Polym. 9, 473-484 (2012) to produce radicals. For the sake of simplicity, and in order to promote grafting of radicals in the "defect spots" rather than the deposition of a new polymer-like material, simple hydrocarbons were used (e.g., $CH_4$) by introducing them during the reduction process. However, a VUV-assisted healing reduction process can be used in conjunction with any simple aliphatic, unsaturated and aromatic hydrocarbons such as, methane, ethylene, acetylene, benzene, toluene, or even with $CO_2$ gas. Adding small amounts of $CH_4$ to the $N_2$ gas carrier reduces the film mass loss during the VUV reduction process, although this effect is not quite as marked as in the case of H2 addition (see results shown in FIGS. 10A and B). On the other hand, $CH_4$ gas seems to be better at healing graphene structures, as shown in FIG. 10B: although not significantly different, the I(D)/I(G) values obtained for films reduced under VUV irradiation with 172 nm in $N_2+CH_4$ atmospheres are systematically lower than those for the films obtained using $N_2+H_2$ atmospheres. In light of the result that points out that $H_2$ is an efficient way to reduce etching produced by residual O— and OH— radicals, and while $CH_4$ has been shown to be an effective way to heal films, the inventors postulate that the two gases can be added together to obtain a more efficient healing-reducing VUV-assisted process for GO films.

Example 7

Wettability Studies

GO dry films were obtained by spraying water-ethanol dispersions containing 0.1-0.2 mg/mL GO flakes onto surfaces of clean and activated Al bright sheet. After spraying, samples were dried under vacuum at 80° C. for up to one hour to remove solvent traces. The GO films were then exposed to VUV radiation from a Xe2* excimer lamp ($\lambda$=172 nm) from Hamamatsu (L12530-01) with a nominal intensity of I=50 mW/cm$^2$ measured on the lamp's window. Samples were then placed 10 mm away from the lamp window, and under different atmospheres ($N_2$, $N_2+CH_4$, $N_2+H_2$), with various proportions (0-6% of the new gas to $N_2$) for durations up to 60 s. Wettability was assessed by measuring DWD and WCA. DWD was determined by measuring the diameter of deionized water droplets of 7 μL volume which were placed using a calibrated micropipette onto the treated surface. WCA measurements were performed using a Dataphysics OCA 15EC contact angle goniometer with electronic syringe and its related software module. A volume of 2 microL of de-ionized water was used in the static sessile drop measurements. 5-10 droplets were placed on the surfaces and their contact angle values were recorded and averaged. Larger values for DWD indicated more wettable (i.e., more hydrophilic) surfaces. Wettability results presented in Table 2 shows that surfaces of r-GO films obtained by VUV irradiation under a dry $N_2$ atmosphere were more hydrophobic than their GO counterparts. The observed differences were most probably due to the presence of residual O— containing groups, or to an introduction of defects during VUV irradiation (e.g., dangling bonds, distorted structures, holes, etc). Such defects distort local dipole moments effectively creating similar effects with the presence of polar groups. Adding small amounts of $CH_4$ to the dry $N_2$ atmosphere rendered r-GO surfaces even more hydrophobic. Samples displayed similar concentrations of residual O ([O]<15%).

Example 8

Functionalization of a Graphene-Like Coating with Fluorocarbon Moieties

Figure 11:
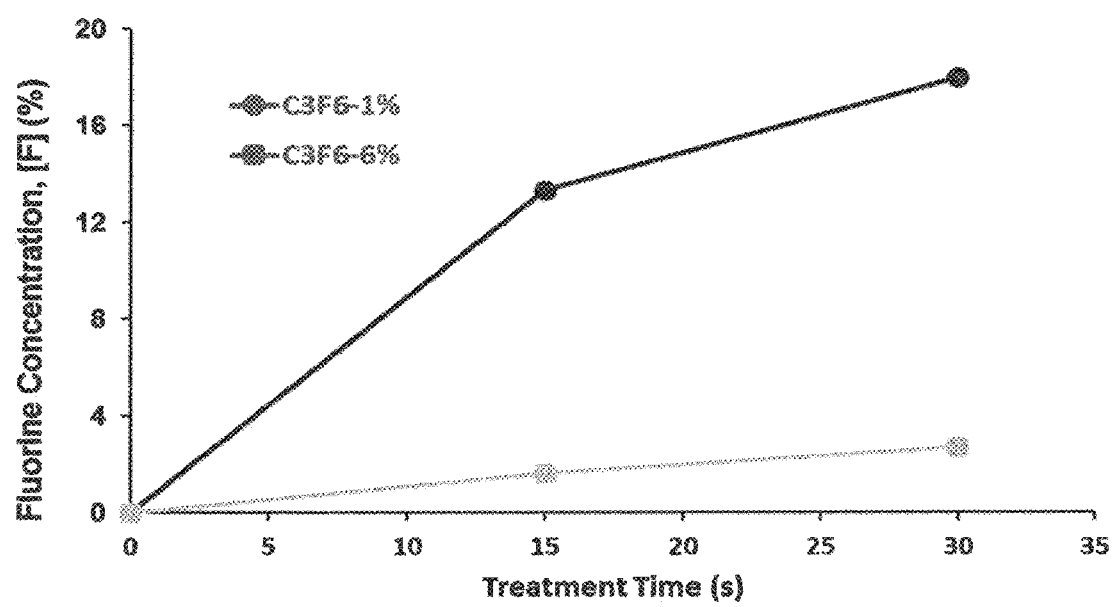
FIG. 11 shows a plot of surface fluorine concentration (atomic %) as a function of treatment time, wherein treatment refers to irradiation under an atmosphere of N2+ 1% C3F6. The atomic concentrations of elements present at the surface of r-GO films was measured using X-ray Photoelectron Spectroscopy.

In certain embodiments, the same set-up as described herein was used to irradiate GO films deposited on either Si wafers or bright Al surfaces under a continuous $N_2$ purge of 20 slm using a $Xe_{b_2}$* lamp ($\lambda$=172 nm) from Hamamatsu Photonics (L12530-01) having an intensity of I=40 mW/cm$^2$ measured at the sample's position. Small amounts (up to 6% v/v) of reactive gas hexafluoropropylene gas, $C_3F_6$, have been introduced in the reaction chamber during the reduction process in an attempt to graft CxFy groups at the r-GO surfaces. Studies compared the conversion efficiencies as measured using XPS for r-GO-F films (reduced and fluorinated GO) with the values obtained during the VUV reduction under pure $N_2$ atmosphere, or under $N_2+H_2/CH_4$ atmospheres. The CE had very low values for the VUV reduction under $N_2+C_3F_6$ atmosphere. Although not wishing to be bound by theory, the inventors suggest that this result was due to the fact that $C_3F_6$ gas absorbs highly at 172 nm. Thus a large portion of photons had been absorbed into the gas phase, leaving a diminished photon flux available for the GO films reduction. However, CxFy radicals (most probably $CF_2$) were generated in the gas phase as a result of absorption of VUV photons followed by molecular scissions. Without wishing to be bound by theory the inventors suggest that these radicals had successfully been grafted onto GO surfaces, creating r-GO-F surfaces (see FIG. 11).

Example 9

Corrosion Protection Studies

Graphene-like films have demonstrated potential for corrosion protection of aluminum sheet. A succession of pictures were prepared showing bright Al substrates that have been covered with graphene-like layers of various thicknesses after they were immersed in corrosive (i.e., 5% NaCl+5% $H_2O_2$) solutions at room temperature for 2 h and 5 h, respectively. See FIG. 9 for details. Such films were proven to be excellent diffusion barriers. They protected substrates against corrosion provided the film thickness was sufficient to efficiently cover the substrate surface. For example, a thickness of 10 nm was sufficient to provide corrosion protection under the harshest experimental conditions (5 hr immersion in 5% NaCl+5% $H_2O_2$ solution).

TABLE 1

Resonant, excimer & halogen rare gas emissions and their wavelengths

| Source | Kr resonant | $Ar_2$* | $Kr_2$* | Xe resonant | $F_2$* | $Xe_2$* | ArCl* | ArF* | KrCl* | KrF* | XeI* |
|---|---|---|---|---|---|---|---|---|---|---|---|
| λ (nm) | 123.6 | 126 | 146 | 147 | 157 | 172 | 175 | 193 | 222 | 248 | 253 |

*indicates an excited dimer (also known as an excimer) or excited complex.

| Coating's irradiation conditions | Treatment time (s) | DWD (mm) | WCA (degrees) |
|---|---|---|---|
| GO (not Irradiated) | | 6.8 | 21.5 |
| Polystyrene (not irradiated) | | 2.91 | 92.4 |
| $N_2$ | 15 | 5.71 | 30.4 |
| $CH_4$-1% | 15 | 4.81 | 32.5 |
| $CH_4$-3% | 15 | 4.91 | 34.2 |
| $C_3F_6$-0.5% | 15 | 2.8 | 103.4 |
| Na | 30 | 6.37 | 35.2 |
| $CH_4$-1% | 30 | 4.45 | 40.6 |
| $CH_4$-3% | 30 | 4.28 | 44.9 |
| $C_3F_6$-0.5% | 30 | 2.8 | 103.5 |

TABLE 3

Conversion efficiency (CE) for graphene-like coatings as a function of gas composition present during the final preparation step, specifically, during irradiation of dry GO coating

| Gas | Treatment time (s) | CE (%) |
|---|---|---|
| $N_2$ | 15 | 66.09 |
| 1%$H_2$ | 15 | 56.22 |
| 1%$CH_4$ | 15 | 39.32 |
| 1%$C_3F_6$ | 15 | 4.43 |
| 1%$H_2$ | 30 | 81.07 |
| 1%$CH_4$ | 30 | 74.35 |
| 1%$C_3F_6$ | 30 | 45.54 |

What is claimed is:

1. A process for coating a substrate with a functionalized graphene-like coating comprising the steps of:
cleaning and activating a substrate by simultaneous exposure of the substrate surface to radiation having a wavelength of about 10 nm to about 200 nm and to an atmosphere that comprises oxidizing radical species at or above atmospheric pressure;
coating the clean and activated substrate with a GO (graphene oxide) coating; and
exposing the GO coating to radiation having a wavelength of about 10 nm to about 200 nm under an atmosphere comprising one or more inert gases and one or more reactive gases at or above atmospheric pressure to form the functionalized graphene-like coating, wherein the functionalized graphene-like coating comprises a functionalized mixture of r-GO (reduced graphene oxide) and graphene.

2. The process of claim 1, wherein the one or more reactive gases comprises a reactive gas comprising a polar moiety, an apolar moiety, a polymerizable moiety, or a combination thereof.

3. The process of claim 2, wherein the polar moiety comprises C—O, C=O, —COO, —C-halo, —C—F, N—H, C—P, P—O—P, P=O, or a combination thereof.

4. The process of claim 2, wherein the apolar moiety comprises C=C, C—N, C—H, C—S, or a combination thereof.

5. The process of claim 2, wherein the polymerizable moiety comprises hexamethyldisiloxane, tetraethyl orthosilicate, titanium ethoxide, titanium isopropoxide, or a combination thereof.

6. The process of claim 2, wherein the functionalized graphene-like coating provides the coated substrate with properties of hydrophobicity, hydrophilicity, oleophobicity, or oleophilicity.

7. The process of claim 1, wherein the one or more reactive gases comprises fluorine, and the functionalized graphene-like coating is a fluorinated graphene-like coating.

8. The process of claim 1, wherein the process is conducted at atmospheric pressure.

9. The process of claim 1, wherein the oxidizing radical species include ozone, atomic oxygen, amino radicals, atomic hydrogen, hydroxide radicals, or a combination thereof.

10. The process of claim 1, wherein coating the clean and activated substrate with a GO (graphene oxide) coating comprises exposing the substrate to a temperature in the range of 80 to 100° C.

11. The process of claim 1, wherein the substrate is a continuous roll of material continuously moved through the process at a rolling speed of 1 to 1000 feet/min.

12. The process of claim 1, wherein coating the substrate with a GO (graphene oxide) coating comprises applying a GO dispersion and drying in an atmosphere of air.

13. The process of 1, wherein the one or more inert gases comprise nitrogen.

14. The process of claim 13, wherein the nitrogen has a gas purity of >99%.

15. The process of claim 1, wherein the functionalized graphene-like coating is for use in an implant, a scaffold for tissue engineering, a product for use in biological warfare, a product for use in a corrosive environment, drug delivery, gene therapy, cancer therapy, a bio-sensor, an electrochemical biosensor, a contact sensors, a nanoelectromechanical sensor, a chemical sensor, or a non-contact sensor.

16. The process of claim 1, wherein the coating the clean and activated substrate with a GO coating comprises applying a GO dispersion via spraying, immersing, spreading via a roller or brush, flow coating, electrodepositing, roll-to-roll processing, painting, dipping, casting, brushing, applying by draw-down bar, doctor blade, knife, air knife, extrusion, heated spray, ink jet, lithography, flexography, or ink roller.

17. The process of claim 16, wherein the GO dispersion is a homogeneous liquid mixture comprising a polar solvent selected from water, ethanol, methanol or a combination thereof.

18. The process of claim 1, wherein the substrate has a surface coverage of the functionalized graphene-like coating of 20 to 100%.

* * * * *